(12) United States Patent
Ko et al.

(10) Patent No.: US 12,037,243 B2
(45) Date of Patent: Jul. 16, 2024

(54) METHOD OF PRODUCING HYDROGEN USING BIOMASS

(71) Applicants: HYUNDAI MOTOR COMPANY, Seoul (KR); KIA CORPORATION, Seoul (KR); Ewha University—Industry Collaboration Foundation, Seoul (KR)

(72) Inventors: Dong Seok Ko, Yongin-si (KR); Woo Jae Kim, Seoul (KR); Hye Min Jung, Cheonan-si (KR)

(73) Assignees: Hyundai Motor Company, Seoul (KR); Kia Corporation, Seoul (KR); EWHA University—Industry Collaboration Foundation, Seoul (KR)

( * ) Notice: Subject to any disclaimer, the term of this patent is extended or adjusted under 35 U.S.C. 154(b) by 471 days.

(21) Appl. No.: 17/340,525

(22) Filed: Jun. 7, 2021

(65) Prior Publication Data

US 2022/0127139 A1   Apr. 28, 2022

(30) Foreign Application Priority Data

Oct. 27, 2020   (KR) .................. 10-2020-0140624

(51) Int. Cl.
*C01B 3/22*   (2006.01)
*C01B 3/32*   (2006.01)

(52) U.S. Cl.
CPC .................. *C01B 3/22* (2013.01); *C01B 3/32* (2013.01); *C01B 2203/0415* (2013.01); *C01B 2203/1211* (2013.01); *C01B 2203/1258* (2013.01); *C01B 2203/1614* (2013.01)

(58) Field of Classification Search
CPC .... C01D 7/07; C01D 7/10; B01J 23/75; B01J 23/74; B01J 19/24; B01J 3/04; B01J 8/22; B01J 8/222; B01J 8/226; C05D 9/00; C01B 3/323; C01B 3/22
See application file for complete search history.

(56) References Cited

FOREIGN PATENT DOCUMENTS

| KR | 10-2007-0073899 | | 7/2007 | |
| WO | WO-2007002504 A1 | * | 1/2007 | .......... B01J 19/2485 |
| WO | WO-2013022897 A1 | * | 2/2013 | ............ B01J 19/245 |

OTHER PUBLICATIONS

Kassaye et al., Hydrolysis of cellulosic bamboo biomass into reducing sugars via a combined alkaline solution and ionic liquid pretreatment steps, Renewable Energy, 104, (2017), 177-184.*

* cited by examiner

*Primary Examiner* — Walter D. Griffin
*Assistant Examiner* — Cameron J Allen
(74) *Attorney, Agent, or Firm* — Fox Rothschild LLP

(57) ABSTRACT

A method of producing hydrogen using biomass includes: pretreating the biomass using an ionic liquid; and extracting hydrogen by reacting the pretreated biomass with an alkaline substance.

10 Claims, 4 Drawing Sheets

FIG. 2
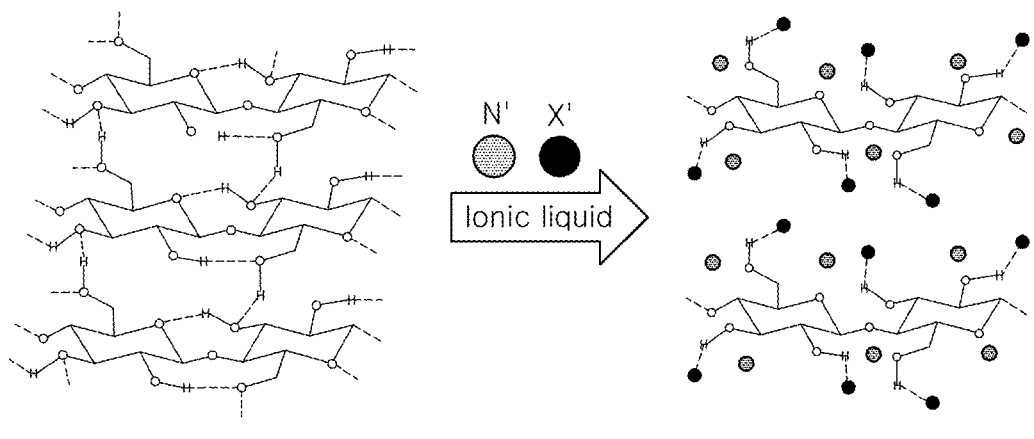
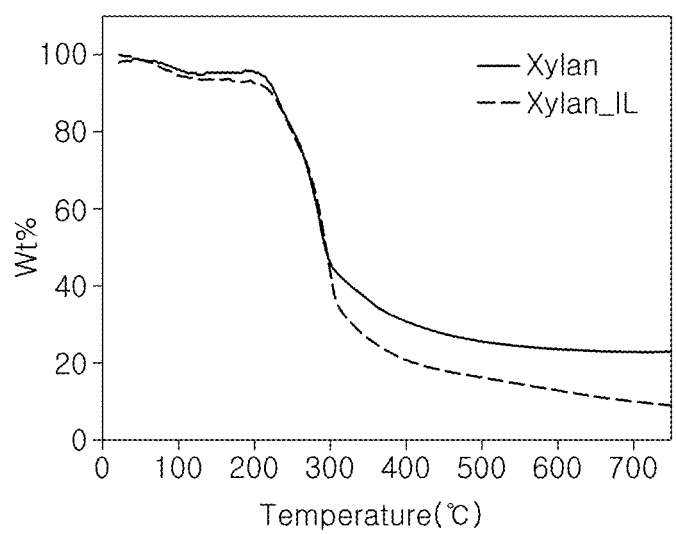
* _IL IS SAMPLE TREATED WITH IONIC LIQUID

FIG. 3
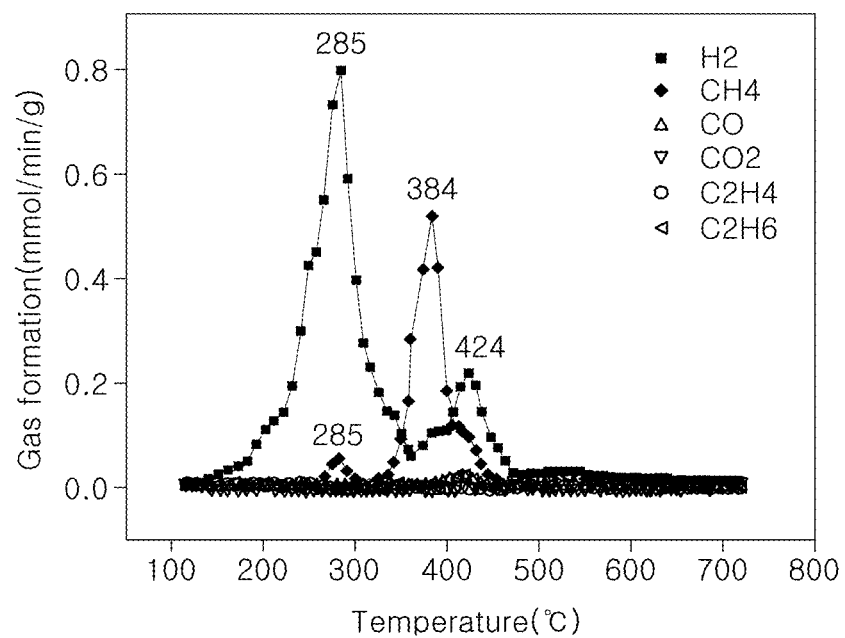
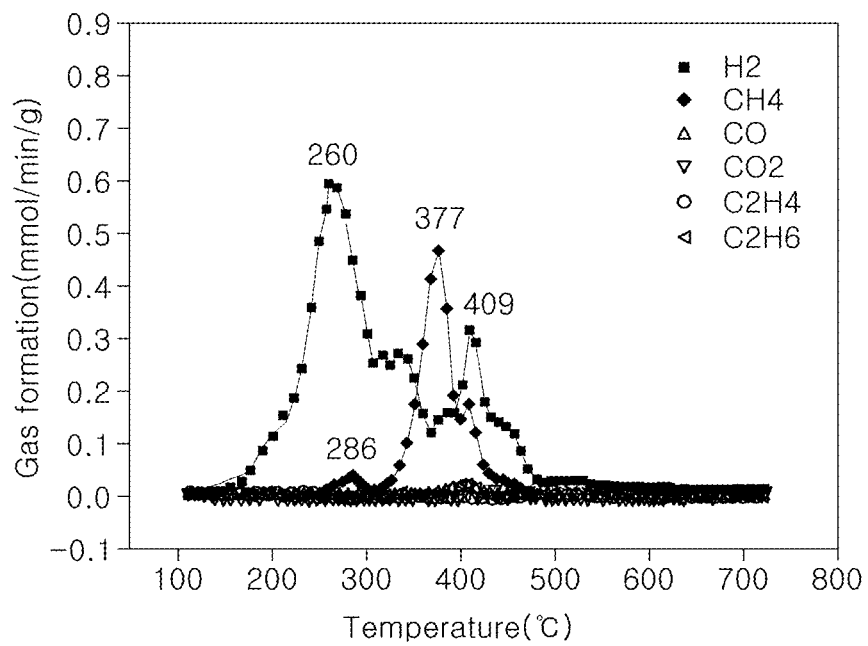

METHOD OF PRODUCING HYDROGEN USING BIOMASS

CROSS REFERENCE TO RELATED APPLICATION

This application claims priority to and the benefit of Korean Patent Application No. 10-2020-0140624, filed on Oct. 27, 2020, the entire contents of which are incorporated herein by reference.

FIELD

The present disclosure relates to a method of producing hydrogen using biomass.

BACKGROUND

The statements in this section merely provide background information related to the present disclosure and may not constitute prior art.

A demand for developing and spreading new renewable energy capable of replacing fossil fuels has increased due to emission of greenhouse gases and global warming, and thus, hydrogen which is evaluated as a clean energy source has been spotlighted. Hydrogen is the most abundant element on earth and exists in various forms such as fossil fuels, biomass, and water. In order to use such hydrogen as a fuel, it is important to produce hydrogen by a method capable of implementing cost-effectiveness and reducing the environmental impact.

About 96% of hydrogen demanded has been recently produced through a reforming reaction by using fossil fuels. The amount of hydrogen produced using biomass is very small. Meanwhile, biomass is evaluated as a clean energy source in that carbon is circulated on earth. Therefore, in order to meet the demand for hydrogen, it is desired to more efficiently produce hydrogen and apply the produced hydrogen to industries.

Examples of methods of producing hydrogen include a method of producing hydrogen through a reforming reaction of fossil fuels, which is a traditional method, and a method of producing hydrogen using biomass and water, which is a renewable method. Specifically, a steam reforming reaction, a partial oxidation reaction, an auto-thermal reforming reaction, and a gasification reaction that are traditional reforming methods are not eco-friendly because greenhouse gases are emitted when hydrogen is produced using these methods.

The renewable method is divided into a thermochemical method using biomass and a biological method, and a method using water is divided into an electrolysis method, a pyrolysis method, and a photolysis method. Among them, the most cost-effective method is a thermochemical method using biomass.

However, many studies on the thermochemical method using biomass have not been conducted due to generation of various by-product gases other than hydrogen depending on types of biomass (tree, algae, green algae, food waste, and the like). Meanwhile, recently, studies have shown that the amount of hydrogen extracted may be increased using a thermochemical reaction based on an alkali-heat treatment.

However, we have discovered that since a side reaction still occurs, it is desirable to develop a method of suppressing a side reaction (reaction in which by-product gases other than hydrogen are generated) to improve selectivity for a hydrogen conversion reaction.

The contents described as the related art have been provided only to assist in understanding the background of the present disclosure and should not be considered as corresponding to the related art known to those skilled in the art.

SUMMARY

The present disclosure provides a method of producing hydrogen using biomass capable of increasing efficiency in the hydrogen production using the biomass by weakening hydrogen bonding in the biomass through a pretreatment of the biomass using an ionic liquid and extracting hydrogen from the pretreated biomass using a thermochemical reaction based on an alkali-heat treatment.

According to one form of the present disclosure, a method of producing hydrogen using biomass includes: pretreating the biomass using an ionic liquid; and extracting hydrogen by reacting the pretreated biomass with an alkaline substance.

The pretreating step may include: reacting the biomass with the ionic liquid and preparing a pretreatment solution; and separating the pretreated biomass from the pretreatment solution.

In reacting step, the ionic liquid may be a liquid containing a chloride ion ($Cl^-$).

Reacting step may further comprise: mixing the ionic liquid and the biomass in a predetermined weight ratio and preparing a mixed solution; and heating the mixed solution at a predetermined temperature for a predetermined time preparing a pretreatment solution.

The mixed solution may be prepared by mixing the ionic liquid and the biomass with each other in a weight ratio of 90 to 99:1 to 10.

The pretreatment solution may be prepared by heating the mixed solution at a temperature of 75 to 100° C. for 5 to 10 minutes.

In pretreating step, the ionic liquid may be 1-butyl-3-methylimidazolium chloride ([BMIM] [Cl]).

Separating step may comprise: supplying distilled water to the pretreatment solution; mixing the pretreatment solution and the distilled water with each other; and removing the ionic liquid and the distilled water from the pretreatment solution.

Extraction step may comprise: mixing an alkaline substance containing sodium hydroxide (NaOH) and the pretreated biomass; and heating the mixture at a predetermined temperature for a predetermined time.

The alkaline substance and the pretreated biomass may be mixed with each other in a molar ratio of 12:1, and the mixture may be heated at 500° C. for 1 hour.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a view illustrating a structure of biomass in which hydrogen bonding is weakened through a pretreatment step of the method of producing hydrogen using biomass according to one form of the present disclosure and a thermogravimetric analysis (TGA) result graph;

Figure 4:
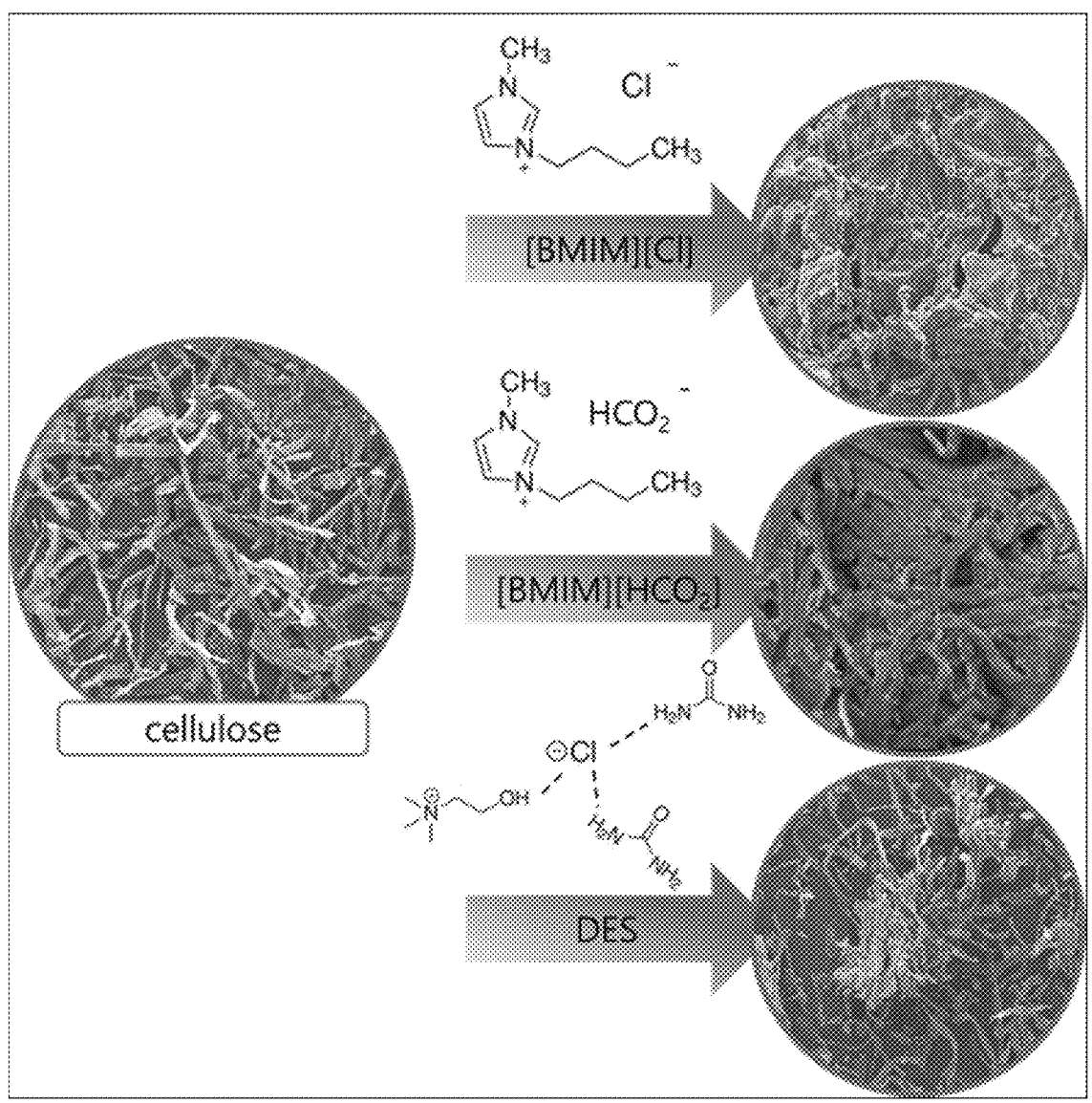

FIG. 3 is a view illustrating graphs for comparing the amounts of hydrogen produced depending on the presence or absence of the pretreatment step of the method of producing hydrogen using biomass according to one form of the present disclosure; and FIG. 4 is a view illustrating a result of pretreating the biomass with each of three substances in the method of producing hydrogen using biomass according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
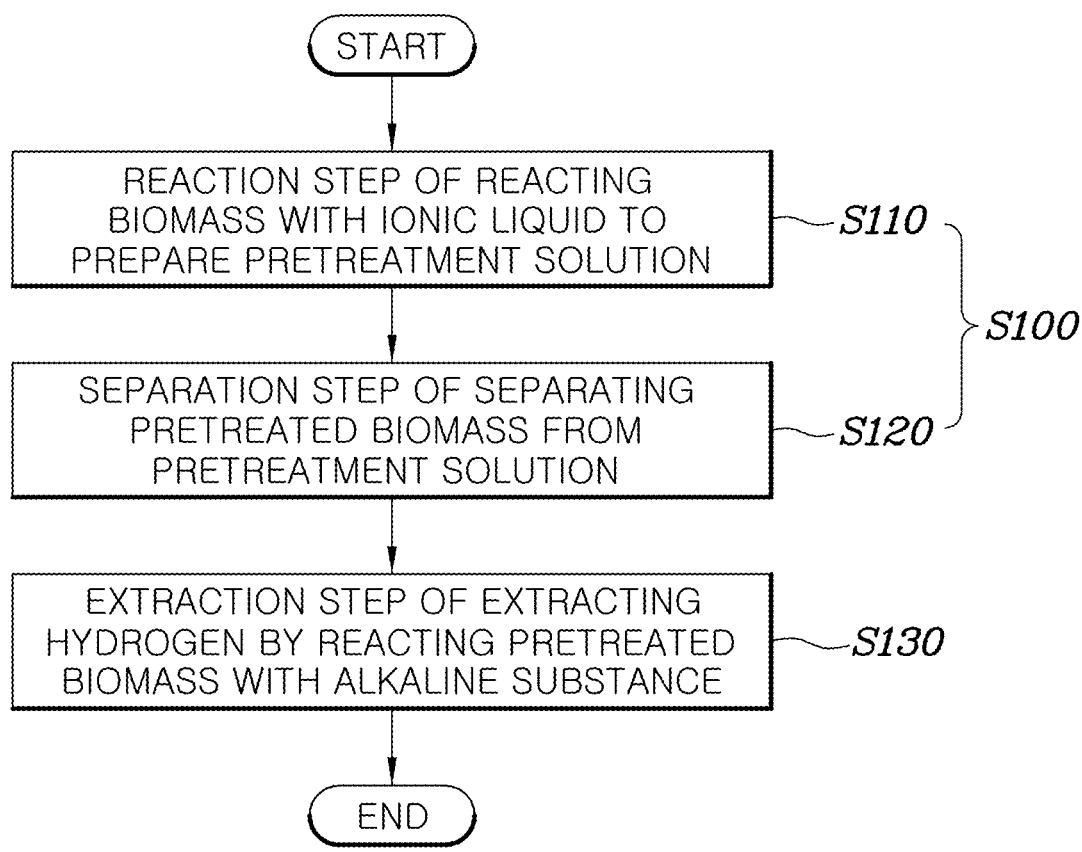
FIG. 1 is a flowchart illustrating a method of producing hydrogen using biomass according to one form of the present disclosure.

FIG. 1 is a flowchart illustrating a method of producing hydrogen using biomass according to one form of the present disclosure. FIG. 2 is a view illustrating a structure of biomass in which hydrogen bonding is weakened through a pretreatment step of the method of producing hydrogen using biomass according to one form of the present disclosure and a thermogravimetric analysis (TGA) result graph. FIG. 3 is a view illustrating graphs for comparing the amounts of hydrogen produced depending on the presence or absence of the pretreatment step of the method of producing hydrogen using biomass according to one form of the present disclosure. FIG. 4 is a view illustrating a result of pretreating the biomass with each of three substances in the method of producing hydrogen using biomass according to one form of the present disclosure.

FIG. 1 is a flowchart illustrating a method of producing hydrogen using biomass according to one form of the present disclosure. FIG. 2 is a view illustrating a structure of biomass in which hydrogen bonding is weakened through a pretreatment step of the method of producing hydrogen using biomass according to one foam of the present disclosure and a thermogravimetric analysis (TGA) result graph. The method of producing hydrogen using biomass according to one form of the present disclosure includes a pretreatment step S100 of pretreating the biomass using an ionic liquid to weaken hydrogen bonding in the biomass; and an extraction step S130 of extracting hydrogen by reacting the pretreated biomass with an alkaline substance.

A thermochemical reaction based on an alkali-heat treatment used in the extraction step S130 of the method of producing hydrogen using biomass according to one form is a new eco-friendly hydrogen production technology capable of suppressing emission of greenhouse gases (carbon dioxide) while producing high purity hydrogen by extracting hydrogen from biomass consisting of carbon, hydrogen, and oxygen and capturing the remaining carbon and oxygen in a carbonate form through a reaction with alkali.

However, selectivity for the thermochemical reaction based on the alkali-heat treatment is not high. Thus, only about 50% of biomass is currently used for producing hydrogen, and the remainder is transformed into hydrocarbon (methane or the like), carbon dioxide, chunks of carbon, and the like. The reason is that alkali ions cannot contact with the biomass due to strong hydrogen bonding in the biomass.

Therefore, it is considered that the selectivity for the thermochemical reaction based on the alkali-heat treatment which is the related art may not be decreased when the strong hydrogen bonding in the biomass is broken. By using the method of producing hydrogen using biomass according to one form of the present disclosure, the strong hydrogen bonding in the biomass is broken, such that the efficiency of the thermochemical reaction based on the alkali-heat treatment may be improved. To this end, the hydrogen bonding in the biomass is effectively broken by pretreating the biomass with an ionic liquid to weaken the hydrogen bonding in the biomass so as to improve the selectivity for the thermochemical reaction based on the alkali-heat treatment of the biomass.

Specifically, in the pretreatment step S100 of the method of producing hydrogen using biomass according to one form of the present disclosure, the ionic liquid may be 1-butyl-3-methylimidazolium chloride ([BMIM] [Cl]). In addition, in the method of producing hydrogen using biomass according to one form of the present disclosure, as an example, among various types of biomass, xylan which is one of the hemicelluloses may be used as the biomass. Referring to FIG. 2, it can be seen that in the biomass before the pretreatment step S100 is performed, the hydrogen bonding in the biomass is strong, but in the biomass after the pretreatment step S100 is performed using the ionic liquid, the hydrogen bonding is partially broken by ions in the ionic liquid, and the hydrogen bonding in the biomass is thus generally weaken. Referring to the TGA result graph on the right side of FIG. 2, it can be seen that, when the pretreatment step S100 is performed using the ionic liquid, the amount of biomass remaining after the extraction step S130 is smaller than when the pretreatment step S100 is not performed.

Meanwhile, in the method of producing hydrogen using biomass according to one form of the present disclosure, the pretreatment step S100 may include a reaction step S110 of reacting the biomass with the ionic liquid to produce a pretreatment solution, and a separation step S120 of separating the pretreated biomass from the pretreatment solution. Specifically, in the reaction step S110, the ionic liquid and the biomass are mixed with each other, and then, the mixture is heated at 75° C. for 5 minutes to pretreat the biomass. In the separation step S120, the remaining pretreated biomass is separated by recovering the ionic liquid using distilled water. Thereafter, in the extraction step S130, hydrogen is extracted by performing the thermochemical reaction based on the alkali-heat treatment on the pretreated biomass.

FIG. 3 is a view illustrating graphs for comparing the amounts of hydrogen produced depending on the presence or absence of the pretreatment step of the method of producing hydrogen using biomass according to one form of the present disclosure. FIG. 4 is a view illustrating a result of pretreating the biomass with each of three substances in the method of producing hydrogen using biomass according to one form of the present disclosure. In the reaction step of the method of producing hydrogen using biomass according to one form of the present disclosure, the ionic liquid may be a liquid containing a chloride ion ($Cl^-$).

First, referring to FIG. 4, it can be seen that in a case where the biomass is pretreated using [BMIM] [Cl], the hydrogen bonding in the biomass is weakened and a distance between molecules is thus widened, and in a case where the biomass is pretreated using [BMIM] [$HCO_2$] and DES, the hydrogen bonding in the biomass is not weakened and a distance between molecules is thus not significantly changed. Accordingly, in a case where an ionic liquid containing 1-butyl-3-methylimidazolium chloride ([BMIM][Cl]) or a chlorine ion (Cl⁻) is used in the pretreatment step S100, the hydrogen bonding in the biomass is weakened, and hydrogen extraction efficiency may thus be increased.

Meanwhile, in the reaction step S110 of the method of producing hydrogen using biomass according to one form of the present disclosure, the ionic liquid and the biomass may be mixed with each other in a predetermined weight ratio to prepare a mixed solution, and the mixed solution may be heated at a predetermined temperature for a predetermined time, thereby preparing a pretreatment solution. In addition, in the method of producing hydrogen using biomass according to one form of the present disclosure, the mixed solution may be prepared by mixing the ionic liquid and the biomass with each other in a weight ratio of 90 to 99:1 to 10. In a case where the weight ratio is 90:10, when the ionic liquid is less than 90%, the ionic liquid and the biomass are not in one-phase. Therefore, it is preferable that the biomass to be mixed is 90% or more and the ionic liquid and the biomass are mixed with each other in a weight ratio of 95:5.

In addition, in the method of producing hydrogen using biomass according to one form of the present disclosure, the pretreatment solution may be prepared by heating the mixed solution at a temperature of 75 to 100° C. for 5 to 10 minutes. In consideration of a melting point of [BMIM] [Cl], the mixed solution needs to be heated at 75° C. or higher, which is a minimum temperature at which [BMIM] [Cl] becomes liquid, and when the mixed solution is heated for at least 5 minutes, a structure of the mixed solution is transformed into an XRD phase. Therefore, the mixed solution is heated at 75° C. or higher for 5 minutes to prepare the pretreatment solution.

Meanwhile, in the separation step S120 of the method of producing hydrogen using biomass according to one form of the present disclosure, distilled water may be supplied to the pretreatment solution to mix the pretreatment solution and the distilled water with each other, and the pretreated biomass may be separated by removing the ionic liquid and the distilled water from the pretreatment solution. Since the biomass is not dissolved in water and the ionic liquid is mixed well with water, distilled water is mixed with the pretreatment solution to remove the distilled water and the ionic liquid together so as to separate only the pretreated biomass. In this case, acetonitrile or isopropanol may be used to avoid leaving a residue in the biomass.

In addition, in the extraction step S130 of the method of producing hydrogen using biomass according to one form of the present disclosure, hydrogen may be extracted by mixing an alkaline substance containing sodium hydroxide (NaOH) and the pretreated biomass with each other and heating the mixture at a predetermined temperature for a predetermined time. As an example, the alkaline substance and the pretreated biomass may be mixed with each other in a molar ratio of 12:1, and the mixture may be heated at 500° C. for 1 hour. This process refers to a thermochemical reaction based on an alkali-heat treatment, and in a case where the alkaline substance is sodium hydroxide, the alkaline substance and the pretreated biomass are mixed with each other in a molar ratio of 12:1 according to the following formula and the mixture is heated at 500° C. for 1 hour.

$$C_6H_{10}O_5 + 12NaOH + H_2O \rightarrow Na_2CO_3 + 12H_2$$

As a result of the extraction step S130, referring to FIG. 3, when the pretreatment step S100 was not performed, the amount of hydrogen produced was 0.826 (L/g-biomass) and hydrogen purity was 73.96, and when the pretreatment step S100 was performed, the amount of hydrogen produced was 0.939 (L/g-biomass) and hydrogen purity was 75.01. Accordingly, it could be confirmed that in a case where the method of producing hydrogen using biomass according to one form of the present disclosure is used, the amount of hydrogen produced was increased by about 14% and the hydrogen purity was also increased.

As set forth above, according to the method of producing hydrogen using biomass of the present disclosure, the biomass is pretreated using the ionic liquid to weaken the hydrogen bonding in the biomass and hydrogen is extracted from the pretreated biomass using the thermochemical reaction based on the alkali-heat treatment, such that the efficiency in the hydrogen production using the biomass may be increased.

Although the present disclosure has been shown and described with respect to various forms, it will be apparent to those having ordinary skill in the art that the present disclosure may be variously modified and altered without departing from the spirit and scope of the present disclosure.

What is claimed is:

1. A method of producing hydrogen using biomass, the method comprising:
   pretreating the biomass using an ionic liquid; and
   extracting hydrogen by reacting the pretreated biomass with an alkaline substance, wherein the pretreating comprises:
   reacting the biomass with the ionic liquid and preparing a pretreatment solution; and
   separating the pretreated biomass from the pretreatment solution.

2. The method of claim 1, wherein the ionic liquid is a liquid containing a chloride ion (Cl⁻).

3. The method of claim 1, wherein the reacting comprises:
   mixing the ionic liquid and the biomass in a predetermined weight ratio and preparing a mixed solution; and
   heating the mixed solution at a predetermined temperature for a predetermined time and preparing a pretreatment solution.

4. The method of claim 3, wherein the predetermined weight ratio of the ionic liquid and the biomass is 90 to 99:1 to 10.

5. The method of claim 3, wherein the predetermined temperature is 75 to 100° C. and the predetermined time is 5 to 10 minutes.

6. The method of claim 1, wherein the ionic liquid is 1-butyl-3-methylimidazolium chloride ([BMIM] [Cl]).

7. The method of claim 1, wherein separating comprises: supplying distilled water to the pretreatment solution; mixing the pretreatment solution and the distilled water with each other; and removing the ionic liquid and the distilled water from the pretreatment solution.

8. The method of claim 1, wherein the extracting comprises:
   mixing an alkaline substance containing sodium hydroxide (NaOH) and the pretreated biomass; and
   heating the mixture at a predetermined temperature for a predetermined time.

9. The method of claim 8, wherein the alkaline substance and the pretreated biomass are mixed in a molar ratio of 12:1, the predetermined temperature is 500° C., and the predetermined time is 1 hour.

10. A method of producing hydrogen using biomass, the method comprising:
    pretreating the biomass using an ionic liquid; and extracting hydrogen by reacting the pretreated biomass with an alkaline substance, wherein the ionic liquid is 1-butyl-3-methylimidazolium chloride ([BMIM] [Cl]).

* * * * *